(12) United States Patent
Jacober et al.

(10) Patent No.: US 7,479,888 B2
(45) Date of Patent: *Jan. 20, 2009

(54) RFID TAG LABEL

(75) Inventors: Linda Jacober, Warwick, RI (US); Ian James Forster, Chelmford (GB)

(73) Assignee: Avery Dennison Corporation, Pasadena, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/674,375

(22) Filed: Feb. 13, 2007

(65) Prior Publication Data

US 2007/0126589 A1   Jun. 7, 2007

Related U.S. Application Data

(63) Continuation of application No. 11/019,147, filed on Dec. 20, 2004, now Pat. No. 7,212,127.

(51) Int. Cl.
G08B 13/14 (2006.01)
(52) U.S. Cl. .............. 340/572.8; 340/572.1; 340/572.3; 340/572.4
(58) Field of Classification Search .............. 340/572.1, 340/572.3, 572.4, 572.7, 572.8, 571, 568.1, 340/10.1; 235/488, 492; 343/718; 283/74
See application file for complete search history.

(56) References Cited

U.S. PATENT DOCUMENTS

| | | | |
|---|---|---|---|
| 3,961,323 A | 6/1976 | Hartkorn | |
| 4,262,284 A | 4/1981 | Stieff et al. | |
| 4,287,514 A | 9/1981 | Wartman et al. | |
| 4,574,192 A | 3/1986 | Kitagawa et al. | |
| 4,636,408 A | 1/1987 | Anthony et al. | |
| 4,729,626 A | 3/1988 | Stieff | |
| 4,746,052 A | 5/1988 | Schmissrauter | |
| 4,840,480 A | 6/1989 | Starke et al. | |
| 4,857,893 A | 8/1989 | Carroll | |
| 4,875,123 A | 10/1989 | Kang | |
| 4,878,045 A | 10/1989 | Tanaka et al. | |
| 4,883,054 A | 11/1989 | Fuller et al. | |
| 5,013,908 A | 5/1991 | Chang | |
| 5,015,842 A | 5/1991 | Fradenburgh et al. | |
| 5,023,595 A | 6/1991 | Bennett | |
| 5,032,823 A | 7/1991 | Bower et al. | |
| 5,097,253 A | 3/1992 | Eschbach et al. | |
| 5,111,184 A | 5/1992 | Heaton et al. | |
| 5,112,890 A | 5/1992 | Behrens et al. | |
| 5,162,390 A | 11/1992 | Tilley et al. | |

(Continued)

OTHER PUBLICATIONS

U.S. Appl. No. 11/048,336, filed Feb. 2005, Mark Kittel.

(Continued)

*Primary Examiner*—Van T. Trieu
(74) *Attorney, Agent, or Firm*—Patent Group Law Department Avery Dennison Corporation

(57) ABSTRACT

A label includes a first portion that is printable with optically readable information and a detachable second portion that has an RFID tag that can be encoded with corresponding RFID information. The printable portion and the RFID portion can thus be printed and encoded, respectively, with information for the same container or object. Both portions can then be kept together until the label is ready to be applied. This greatly reduces the chances of applying mismatched optical and RFID labels.

25 Claims, 3 Drawing Sheets

U.S. PATENT DOCUMENTS

| | | | |
|---|---|---|---|
| 5,189,369 A | 2/1993 | Takane et al. | |
| 5,189,396 A | 2/1993 | Stobbe | |
| 5,202,673 A | 4/1993 | Conrad | |
| 5,285,734 A | 2/1994 | MacPherson | |
| 5,369,140 A | 11/1994 | Valet et al. | |
| 5,406,263 A | 4/1995 | Tuttle | |
| 5,421,177 A | 6/1995 | Sieber et al. | |
| 5,440,289 A | 8/1995 | Riordan | |
| 5,506,566 A | 4/1996 | Oldfield et al. | |
| 5,506,567 A | 4/1996 | Bichlmaier et al. | |
| 5,559,163 A | 9/1996 | Dawson et al. | |
| 5,612,675 A | 3/1997 | Jennings et al. | |
| 5,646,592 A | 7/1997 | Tuttle | |
| 5,656,996 A | 8/1997 | Houser | |
| 5,689,243 A | 11/1997 | Bianco | |
| 5,804,810 A | 9/1998 | Woolley et al. | |
| 5,831,531 A | 11/1998 | Tuttle | |
| 5,884,425 A | 3/1999 | Baldwin | |
| 5,896,370 A | 4/1999 | Eckhoff et al. | |
| 5,936,530 A | 8/1999 | Meinhold | |
| 6,002,343 A | 12/1999 | Auerbach et al. | |
| 6,027,027 A | 2/2000 | Smithgall | |
| 6,043,746 A | 3/2000 | Sorrells | |
| 6,050,622 A | 4/2000 | Gustafson | |
| 6,069,563 A | 5/2000 | Kadner et al. | |
| 6,091,607 A | 7/2000 | McKeown | |
| 6,100,804 A | 8/2000 | Brady et al. | 340/572.7 |
| 6,133,836 A | 10/2000 | Smith | |
| 6,206,292 B1 | 3/2001 | Robertz et al. | 235/488 |
| 6,236,314 B1 | 5/2001 | Smith et al. | |
| 6,265,973 B1 | 7/2001 | Brammall et al. | |
| 6,278,369 B2 | 8/2001 | Smith et al. | |
| 6,304,183 B1 | 10/2001 | Causey | |
| 6,333,693 B1 | 12/2001 | Smith | |
| 6,339,385 B1 | 1/2002 | Tuttle | |
| 6,400,268 B1 | 6/2002 | Lindskog | |
| 6,416,857 B1 | 7/2002 | Wright et al. | |
| 6,420,971 B1 | 7/2002 | Leck et al. | |
| 6,424,262 B2 | 7/2002 | Garber et al. | |
| 6,429,776 B1 | 8/2002 | Alicot et al. | 340/572.1 |
| 6,448,886 B2 | 9/2002 | Garber et al. | |
| 6,480,110 B2 | 11/2002 | Lee | |
| 6,514,367 B1 | 2/2003 | Leighton | |
| 6,536,082 B2 | 3/2003 | Berrocal et al. | |
| 6,603,400 B1 | 8/2003 | Shoobridge | 340/572.1 |
| 6,608,911 B2 | 8/2003 | Lofgren et al. | |
| 6,640,394 B1 | 11/2003 | Berrocal et al. | |
| 6,662,430 B2 | 12/2003 | Brady et al. | |
| 6,669,508 B2 | 12/2003 | Nakamura et al. | |
| 6,836,215 B1 | 12/2004 | Laurash et al. | 340/572.1 |
| 6,888,509 B2 * | 5/2005 | Atherton | 343/718 |
| 6,994,262 B1 * | 2/2006 | Warther | 235/492 |
| 7,000,951 B2 * | 2/2006 | Valenti, Jr. | 283/74 |
| 7,012,531 B2 | 3/2006 | Fries | |
| 7,098,794 B2 | 8/2006 | Lindsay | |
| 7,102,522 B2 * | 9/2006 | Kuhns | 340/572.7 |
| 2002/0008623 A1 | 1/2002 | Garber et al. | |
| 2002/0089434 A1 | 7/2002 | Ghazarian | |
| 2003/0075608 A1 | 4/2003 | Atherton | |
| 2004/0119593 A1 | 6/2004 | Kuhns | |
| 2005/0012616 A1 | 1/2005 | Forster et al. | |
| 2005/0275540 A1 | 12/2005 | Halope | |
| 2006/0061475 A1 | 3/2006 | Moskowitz et al. | |
| 2006/0132313 A1 | 6/2006 | Moskowitz | |
| 2006/0145870 A1 | 7/2006 | Coveley | |
| 2006/0152363 A1 | 7/2006 | Kraft | |
| 2006/0195705 A1 | 8/2006 | Ehrensvard | |
| 2006/0290502 A1 | 12/2006 | Rawlings | |

OTHER PUBLICATIONS

Office action dated Aug. 25, 2006 from U.S. Appl. No. 11/019,147.
Amendment dated Oct. 26, 2006 from U.S. Appl. No. 11/019,147.
Notice of Allowance dated Nov. 28, 2006 from U.S. Appl. No. 11/019,147.

\* cited by examiner

RFID TAG LABEL

RELATED APPLICATIONS

This application is a continuation of U.S. patent application Ser. No. 11/019,147, filed Dec. 20, 2004, now U.S. Pat. No. 7,212,127, which is herein incorporated by reference for all purposes.

BACKGROUND

1. Field of Invention

This invention relates generally to RFID tags and labels and, more particularly, to RFID tags and labels that have both RFID information and optically readable information.

2. Related Art

Typically, products stored in containers, such as cartons, boxes, and wrappers, are identified by a label on the outside of the container. Identifying information may also be printed directly onto the container with inkjet or any other suitable printing technology. The label may have optically readable information, such as a UPC barcode. These labels enable optical readers using a laser beam to scan the information contained thereon, such as description, price, date packaged, or any other usable data. One disadvantage of optically readable labels is that the optical reader and the label must be within a specific spatial relationship to each other, such as within a line of sight or along a perpendicular scan direction, or within a limited range to the optical reader.

A more recent type of label uses RFID or Radio Frequency Identification tags to store information. RFID uses radio frequency signals to acquire data from RFID tags within range of an RFID reader. RFID transponders or tags, either active or passive, are typically used with the RFID reader to read information from the RFID tag embedded in a label. RFID tags and labels can be obtained through companies such as Alien Technology Corporation of Morgan Hill, Calif. For passive tags, a typical RFID reader/writer energizes transponder circuitry in the tag by transmitting a power signal. The power signal may convey data, which can be stored in a transponder memory, or the transponder circuitry may transmit a response signal containing data previously stored in its memory. If the transponder circuitry transmits a response signal, the RFID reader/writer receives the response signal and interprets the stored data. The data is then transmitted to a host computer for processing.

One advantage of RFID labels is that line of sight is no longer required to read the label. This is a significant advantage since with barcodes, anything blocking the laser beam from the barcode would prevent the barcode from being read. Using radio frequencies enables RFID labels to be read even when line of sight is not present between the RFID label and the RFID reader. As the cost and size of RFID tags decrease, an ever-increasing number of companies and groups are favoring or requiring RFID labels on their products.

Even with a growing trend toward RFID labels, there are advantages to placing optical information on a label so that the package has both optical and RFID information, such as having the ability to read the label using more than one technology. This may be beneficial because RFID label technology is not as widespread as barcode technology, and many businesses or users may not have suitable RFID readers to read the RFID tag. Thus, it is desirable to have both RFID and optically readable information on a container.

However, it is crucial that the RFID label and the optically readable label contain information meant for or corresponding to the container. If the labels are mismatched, significant problems may arise, such as errors in tracking or maintaining information about the container. When both types of label are applied manually to the container, such as by line workers, the chance of mismatched labels increases due to human error. Furthermore, because RFID labels are structurally different from optically readable labels, e.g., the presence of an RFID tag embedded in the RFID label, many printers currently available print the RFID label and the optically readable label separately, either using the same printer system or separate printers. As a result, there is a greater likelihood that corresponding RFID labels and optically readable labels are not paired together. This increases the chances of having mismatched labels placed onto a container.

Therefore, there is a need for a combined RFID label and optically readable label and method of using the same that overcomes disadvantages of conventional methods discussed above.

SUMMARY

According to one aspect of the present invention, a label includes an RFID tag portion and a printable portion for optically readable information, with both portions secured to an underlying adhesive layer, which may be a releasable adhesive liner or a linerless adhesive layer such as a surface coated with glue. The RFID tag portion can be separated from the printable portion, such as by perforations between the two portions. Consequently, an RFID label and a corresponding optically readable label are kept together until application to the container. At that time, the optically readable label can be separated from the RFID label and applied to the container at a desired location. The RFID label can then be applied immediately to the same container so that the chances of mismatched labels on a container are greatly reduced. The RFID label and optically readable label may contain the same information, which is advantageous if either label becomes unreadable. This can occur for various reasons, such as if one of the labels becomes damaged or the user does not have readers that can read both labels. The RFID label and optically readable label may also contain complementary or supplemental information, which is advantageous if the end user requires only certain information to be optically readable.

In one embodiment, perforations are provided in the label and disposed perpendicular to the direction of printing/encoding of the label, which enables sequential printing/encoding of the label. For example, an RFID tag in the RFID tag portion may first be encoded and then the printable portion printed with corresponding optically readable information, such as a bar code. The sequence may also be reversed, such that the printable portion is first printed with optically readable information, followed by an RFID encoder programming the RFID tag portion with corresponding information.

In another embodiment, the perforations are disposed parallel to the direction of printing/encoding of the label. In this embodiment, the printing and encoding can be performed in parallel. For example, a print head can be located on one side of the label having the printable portions and an RFID encoder can be located on the other side of the label having the RFID tag portions. The print head and encoder can be side-by-side or staggered. Either way, such a configuration of the label enables the print head to continuously print optically readable information in parallel with the encoder continuously encoding RFID tags. This embodiment also enables more optimal placement of the encoder and print head. Since the RFID tag portion has an RFID tag embedded therein, the RFID tag portion may be thicker, at least in some areas, than the printable portion. Because the portion of the label that passes below the print head is always the printable portion during printing, the print head can be optimally placed in close proximity to the printable portion of the label without worrying about thicker RFID portions contacting the print head.

In yet another embodiment, in addition to the RFID tag and printable portions, the label has a third portion separable from the RFID tag portion and the printable portion. The releasable adhesive liner of the RFID tag portion is bonded to the edge of the third portion, where the third portion does not have a releasable adhesive liner below. In this embodiment, after printing and encoding, the optically readable portion can be separated from the RFID portion. The releasable liner below the optically readable portion can be removed and the optically readable portion applied to a container. The RFID portion, if left attached to the third portion, can then be used as a hanging tag, since the releasable adhesive liner below the RFID portion is bonded to the edge of the third portion to prevent the adhesive liner from peeling off and separating from the RFID tag. However, if it is desirable to apply the RFID portion to a container, the RFID portion and the third portion can be separated, thereby enabling the underlying adhesive liner to be easily separated from the RFID portion.

In a further embodiment of the present invention, a label includes an RFID tag portion and a conductor-containing portion adjacent the RFID tag portion, in which the RFID tag portion can be separated from the conductor-containing portion, such as by perforations disposed between the two portions. The conductor may cross the perforation and be in contact with the RFID portion, or the conductor may be separate from the RFID portion. When the conductor-containing portion is separated from the RFID portion, certain characteristics, such as operating parameters, of the RFID portion can be desirably changed. Thus, the label of this embodiment has two states, one in which the two portions are attached, and another one in which the two portions are separated, thereby separating a conductor from the RFID portion. This enables one label to have properties of two labels, one in the unseparated state, and one in the separated state.

These and other features and advantages of the present invention will be more readily apparent from the detailed description of the preferred embodiments set forth below taken in conjunction with the accompanying drawings.

BRIEF DESCRIPTION OF THE DRAWINGS

Embodiments of the present invention and their advantages are best understood by referring to the detailed description that follows. It should be appreciated that like reference numerals are used to identify like elements illustrated in one or more of the figures.

DETAILED DESCRIPTION

Figure 1A:
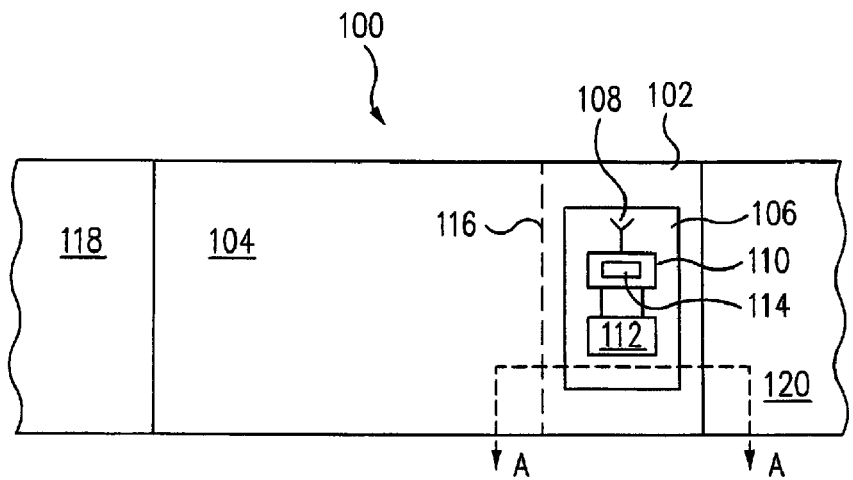
FIGS. 1A and 1B are top plan and partial cross-sectional views, respectively, of a label according to one embodiment of the present invention.

FIG. 1A is a top plan view of a label 100 according to one aspect of the present invention. The label 100 includes an RFID portion 102 and a printable portion 104 for printing optically readable information, such as a bar code, text, symbols, and/or numbers. The RFID portion 102 includes an RFID tag 106, which can be a conventional passive or active RFID tag, such as is available from a number of manufacturers, including Alien Technology Corporation, Matrics, Inc. of Rockville, Md., and Philips Semiconductor of the Netherlands. The size, dimension, and position of RFID tag 106 are shown for discussion and illustration purposes, and do not indicate a preferred size or placement of the tag. The RFID tag 106 comprises an antenna 108, a transponder 110 and an optional energy storage device 112, such as a battery or capacitor. The RFID tag 106 may be placed at any suitable location within the label 100 for interrogation, such as for encoding or reading, by an RFID encoder in a printer system. The RFID tag 106, in response to being interrogated, transmits information or data stored in a memory 114, to an RFID reader via an antenna associated with the reader. The memory 114 can be any suitable memory used in conventional RFID tags.

The RFID portion 102 and the printable portion 104 can be separated by a perforation 116. Those skilled in the art will appreciate that other means of separation may also be used, such as a partial depth-wise cut disposed along the complete width of the label. The separation means can also simply be a printed indicia that indicates to the user where the label is to be cut for separation. In the embodiment of FIG. 1, the label 100 is part of a roll of labels, in which a portion of a second label 118 and a portion of a third label 120 are shown disposed on either side of the label 100. The portion of the second label 118 is an RFID portion, and the portion of the third label 120 is a printable portion.

In operation, a printer system has both an RFID encoder sub-system and an optically readable printing sub-system, such as a thermal printer provided with a thermal print head. The roll of labels is unwound and passed through the RFID encoder first. The RFID encoder interrogates the RFID portion 102. Interrogation can comprise programming the RFID tag 106, reading information from the RFID tag 106, or other RFID operations. For example, the RFID tag 106 may be preprogrammed with both RFID information and printable information for the label. In this situation, the RFID encoder reads the RFID portion 102 and conveys the printable information to the printer sub-system, such as by a wireless or wired data stream.

The printer sub-system then uses the information to print optically readable information, such as a bar code or human-readable indicia, on the printable portion 104. Other optically readable information can include an indicator that the printable portion 104 is associated with the RFID portion 102 forming label 100. In this example, the printer system does not need to be connected to or in communication with an external host computer, since the printing information is encoded in the tag. In another use, RFID portion 102 and/or printable portion 104 can be encoded and/or printed at a place the labels are produced. The encoding and/or printing may be complete or partial. The roll of labels are then shipped to a place where the labels are applied, such as at a factory. There, additional encoding and/or printing can be performed, based on information stored in the RFID tag or on optically readable information. This has numerous potential advantages, such as, but not limited to, flexibility of the manufacturer in making more general labels and more control at the factory for customizing the labels.

The printer sub-system can communicate with the RFID sub-system to ensure that the information on both the RFID portion 102 and the printable portion 104 of the label matches. As a result, the label 100 is encoded and printed with matching information. The next label 118 can then be encoded with information in the RFID portion and printed with information on the printable portion.

Once the label 100 has been encoded and printed, the RFID portion 102 and the printable portion 104 can be separated, such as by tearing along the perforation 116. As a result, a person can keep an RFID label and a corresponding optically readable label together until ready for application. When ready to apply, the RFID portion 102 can be detached from label 100 and attached to a desired location on a container or other object. The printable portion 104 can be attached immediately before or after to the same object. This reduces the chances of applying mismatched labels to a object. Also, this permits placement of the RFID portion 102 and the printable portion 104 at different locations on the container, as may be desirable to satisfy special requirements for the container such as subsequent interrogation by an RFID portal reader or RFID conveyor reader.

Figure 1B:
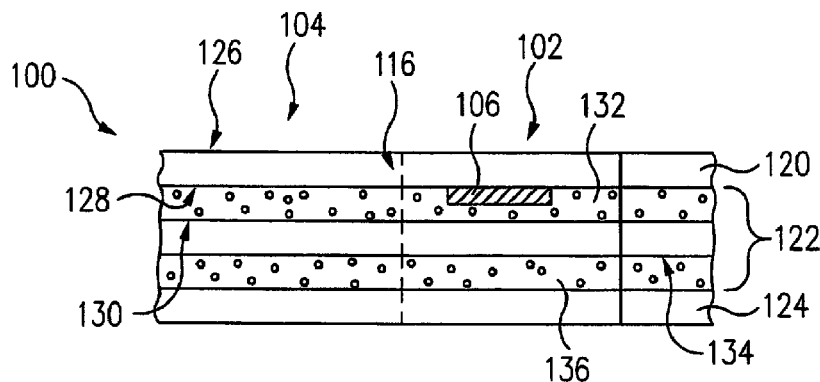

FIG. 1B is a partial cross-sectional side view of one embodiment of label 100, as viewed along the sectional lines A-A of FIG. 1A. The printable portion 104 is disposed on the left hand side of the perforation 116, and the RFID portion 102 is disposed on the right hand side of the perforation 116. The label 100 has a top layer 120 onto which optically readable information is printed (on printable portion 104), an intermediate layer 122, and a liner 124. An RFID tag 106 is secured between the top layer 120 and the intermediate layer 122. The top layer has a first surface 126, which is an outer or upper exterior surface when the label is used, and a second surface 128 opposite the first surface 126. Optically readable information is printed on the first surface 126 of the printable portion 104.

The intermediate layer 122, in this embodiment, is a double-sided tape having a first surface 130 with a first pressure sensitive adhesive 132 and a second surface 134 with a second pressure sensitive adhesive 136 respectively disposed thereon. The RFID tag 106 is embedded between the top layer 120 and the intermediate layer 122 by the first pressure sensitive adhesive 132. The second adhesive 136 is covered by release liner 124, which can be a conventional silicone-coated liner.

With this embodiment, the RFID tag 106 of the RFID portion 102 is encoded with information corresponding to optically readable information printed on the first surface 126 of the printable portion 104. The resulting single label thus has matching information on both the RFID portion and the printable portion. When ready for application to a container or other object, the RFID portion 102 is separated from the printable portion 104 by tearing along the perforation 116. The release liner 124 can then be peeled away from the intermediate layer 122 to expose the second adhesive 136. The RFID portion 102 and the printable portion 104 are now ready for application to the object. If desired, the release liner 124 is removed before the RFID portion 102 and the printable portion 104 are separated. The labels or roll of labels of the present invention can be manufactured using conventional methods and systems, such as disclosed in commonly-owned U.S. Pat. No. 6,416,608, entitled "Method for Producing a Multi-Layer Label and Device for Implementing Said Method", which is incorporated by reference in its entirety. Off-repeat converting machines, such as the bielomatik T-100 Machine Series, are also suitable for making the two and three part labels of the present invention.

Figure 2A:
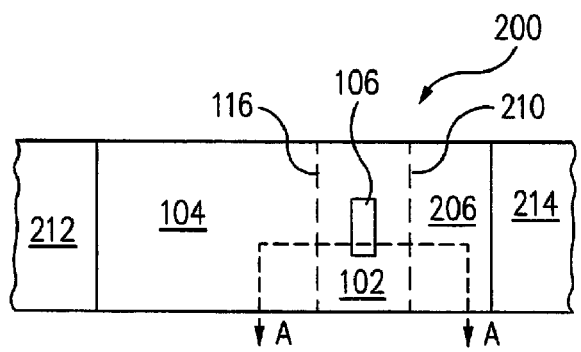
FIGS. 2A and 2B are top plan and partial cross-sectional views, respectively, of a label according to a second embodiment of the present invention.
Figure 2B:
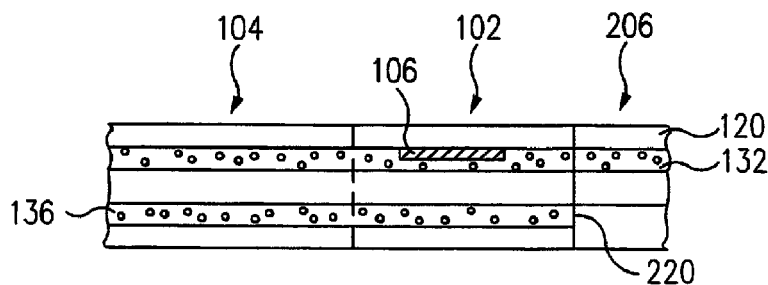

FIGS. 2A and 2B show top plan and partial cross-sectional side views of a label 200 according to another embodiment of the present invention. Referring to FIG. 2A, the label 200 includes an RFID portion 102, a printable portion 104, and an extension portion 206, wherein the RFID portion 102 is shown disposed between the printable portion 104 and the extension portion 206. However, it should be noted that the extension portion 206 can be disposed in other locations, depending on the particular application at hand, such as between the RFID portion 102 and the printable portion 104. The printable portion 104 can be separated from the RFID portion 104, such as by means of the perforation 116, and the extension portion 206 can also be separated from the RFID portion 104, such as by means of a second perforation 210. In the particular exemplary embodiment illustrated in the figure, a portion 212 of a label on the left hand side is an extension portion of that label, and a portion 214 of a label on the right hand side is a printable portion of that label.

Referring now to FIG. 2B, it may be seen that the label 200 is similar to the label 100 of FIGS. 1A and 1B, except for the addition of the extension portion 206. Thus, similar elements (represented by same element numbers) can be referenced from FIGS. 1A and 1B. The extension portion 206 includes the top layer 120 and the first adhesive layer 132. The second adhesive layer 136 is bonded to an edge portion 220 at the interface or boundary between the RFID tag portion 102 and the extension portion 206. With the extension portion 206 attached to the RFID tag portion 102, the second adhesive layer 136 remains bonded to portion 220, which prevents the liner 124 from separating from the combined RFID tag (portions 102 and 206). However, when the extension portion 206 is separated from the RFID tag portion 102, such as by tearing along the perforation 210, the bond is broken and second adhesive layer is free to be removed for application of the RFID tag portion 102.

The embodiment of FIGS. 2A and 2B provides an RFID label having two possible forms of use after the printable portion is detached. In one form, when the RFID portion 102 is separated from the extension portion 206, the release liner 124 can be peeled off to expose the second adhesive 136. This form enables the RFID tag to be applied directly to an object by the adhesive, in a manner similar to the embodiment of FIGS. 1A and 1B described above. In the second form, the extension portion 206 remains attached to the RFID portion 102. Because the release liner 124 is bonded to the extension portion 206, the release liner cannot be peeled off the extension portion 206. Consequently, the RFID label, comprising the RFID portion 102 and the extension portion 206, can be used as a conventional hang tag. This is advantageous because different applications may require different types of RFID labels, either adhesively applied to the object or attached as a hanging tag (e.g., by plastic ties). During manufacture, the printer system, via the optically readable printer sub-system, can print visible markings on the label or on the carrier web immediately adjacent to the label, instructing the user whether to separate RFID portion 102 and extension portion 206 or to leave them attached.

In the above embodiments, the perforations separating the RFID portion from the printable portion and/or the extension portion are oriented along the width of the roll of labels, i.e., perpendicular to the travel of the labels, for encoding/printing. In other embodiments, shown in FIGS. 3A, 3B, 4A, and 4B, the perforations are oriented along the length of the roll of labels, i.e., parallel to the travel of the labels, for encoding/printing.

Figure 3:
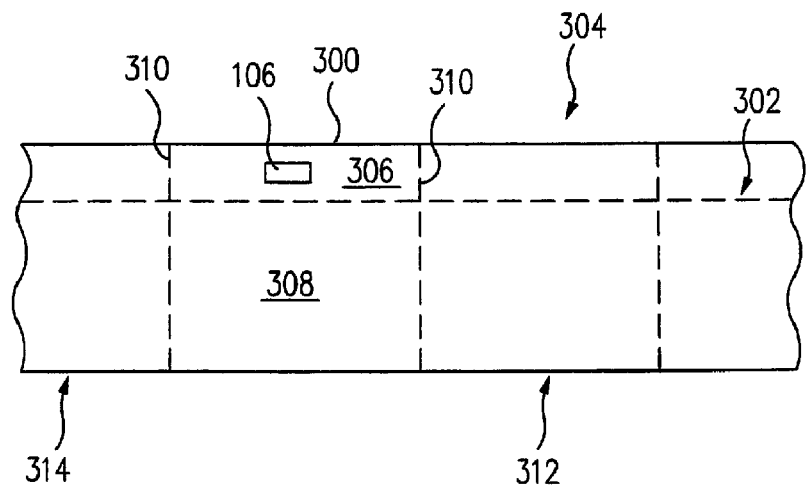
FIG. 3 is a top plan view of a label according to a third embodiment of the invention.

FIG. 3 is a top plan view of a label 300 and shows a perforation 302 or other separation means oriented along the length of a roll 304 of labels. The perforation 302 separates an RFID portion 306 from a printable portion 308, while the perforations 310 separate adjacent labels 312 and 314.

Figure 4:
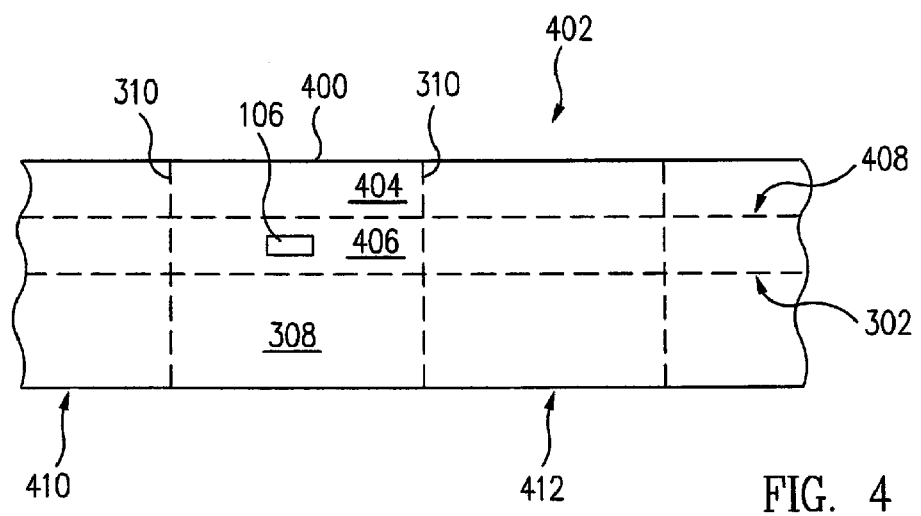
FIG. 4 is a top plan view of a label according to the third embodiment.

FIG. 4 is a top plan view of a label 400. FIG. 4 shows a portion of a roll 402 of labels similar to the labels 306, except that an extension portion 404 is adjacent an RFID portion 406. A perforation 408 separates the RFID portion 406 from the extension portion 404, where the extension portion 404 provides at least the same benefits as the extension portion 206 of FIGS. 2A and 2B, i.e., a label having an RFID portion that can be adhesively applied to an object, or alternatively, hung thereon as a tag. The extension portion 404 can also be disposed in other locations, such as between the RFID portion 406 and the printable portion 308. The perforations 310 again separate adjacent labels 410 and 412.

However, in contrast to the embodiments of FIGS. 1A, 1B, 2A, and 2B, in this embodiment, the optical printing and the RFID encoding may be effected simultaneously or in parallel, instead of sequentially. This enables the printer system to be configured or designed such that the printable portions travel below only the print head, and the RFID portions travel below only the RFID encoder. As a result, the print head can be placed very close to the top or print surface of the RFID portions, while the RFID encoder can independently be placed very close to the top surface of the RFID portions. As will be appreciated by those of skill in the art, because the RFID portion has an RFID tag embedded within its layers, the RFID portion of many types of RFID labels will have a greater thickness or higher profile than the printable portion. With conventional labels, the thicker RFID portions may interfere with the print head, resulting in disruptions to printing, and/or damage to the labels or the print head. If the print head is raised so that it clears the RFID portions during printing/encoding, the print head will be disposed farther away from the printable portions, resulting in poorer quality printing. Thus, having the ability to arrange the respective heights of the print head and/or the RFID encoder independently of one another provides a more optimal printing and encoding of the label.

Another advantage of having the RFID portions and the printable portions of the label disposed side-by-side is that the chances of applying mismatched labels to an object are reduced. Referring to FIGS. 3 and 4, after a roll of labels is printed and encoded, the individual labels 302 or 402 are separated by tearing along the perforations 310. Once the individual labels 300, 312, 314 or 400, 410, 412 are detached from the roll, the RFID portion and the corresponding printable portion remain attached to each other until ready for application to an object.

Figure 5A:
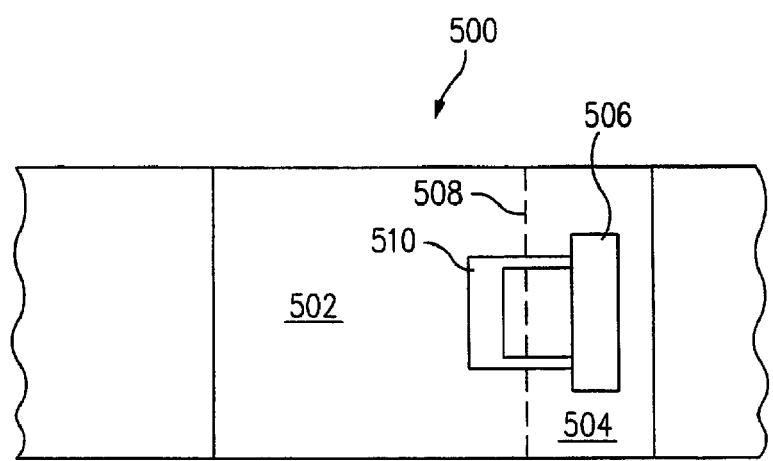
FIGS. 5A-5C are top plan views of a label having an electrical component disposed in the printable portion according to different embodiments of the present invention.

FIG. 5A is a top plan view of a label 500 according to yet another embodiment of the invention. The label 500 has a printable portion 502, an RFID portion 504 with an RFID tag 506, and a perforation 508 separating the printable portion 502 from the RFID portion 504, as before. However, in this embodiment, the RFID tag 506 has an electrical conductor 510 extending from the RFID tag 506 across the perforation 508 and into the printable portion 502. The conductor 510 can be any type of electrically conductive material, such as copper, that provides a conductive path or coupling to the antenna or circuitry of the RFID tag. Thus, when RFID portion 504 is attached to the printable portion 502, a conductive path or coupling is maintained with RFID tag 506, and a first operational state exists for the RFID portion 504. In a second state, the RFID portion 504 is separated from the printable portion 502 by tearing along the perforation 508, which severs the connection or coupling with the RFID tag 506.

Figure 5B:
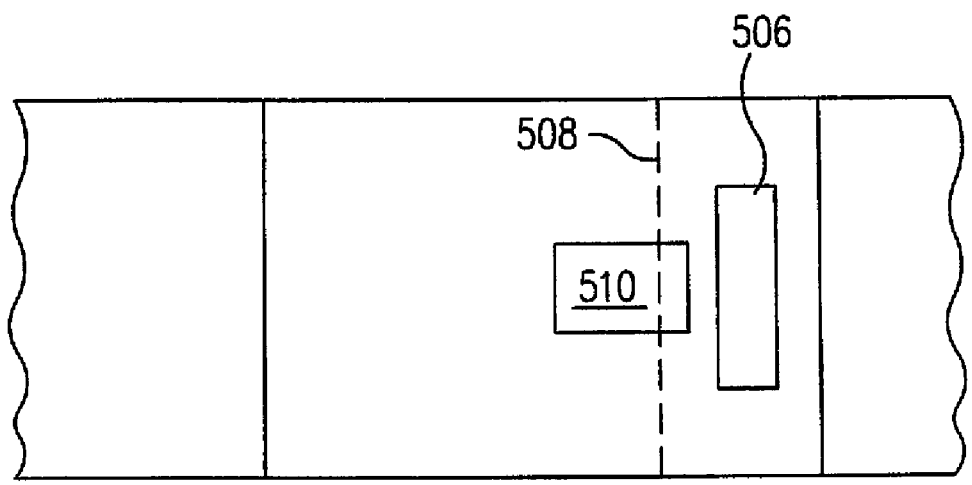
Figure 5C:
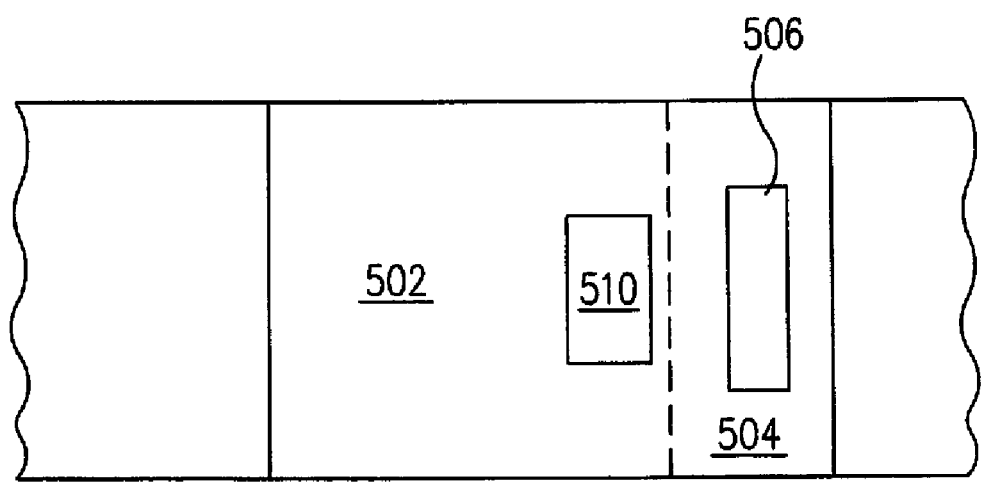

In other embodiments, the conductor 510 is not directly connected to the RFID tag 506, but instead, provides an indirect coupling with the RFID tag 506, as shown in FIG. 5B. Here, the conductor 510 still crosses the perforation 508, but does not actually contact the RFID tag 506. FIG. 5C shows yet another embodiment, in which the conductor 510 is disposed entirely within the printable portion 502, but within sufficient proximity to the RFID tag 506 to provide the necessary coupling to the RFID tag 506 when the RFID portion 504 and the printable portion 502 are attached. The conductor 510 can be located within or between various layers of the label, such as printed on the release liner, formed as an additional layer, or formed on a substrate. Although the orientation of the RFID portion 504 and the printable portion 502 is shown as in the embodiment of FIG. 1A, the RFID portion and the printable portion may also be placed side-by-side, as shown in the embodiment of FIG. 2A.

Although the above embodiments describe the use of a conductor, it should be understood that any suitable electrical element that can change an operational parameter of the RFID portion in a desirable way when detached from the RFID portion may also be used in the present invention. This includes dielectric or magnetic materials. Materials, such as a copper conductor, may be selected to inhibit energy of the RF signal radiated from the antenna during interrogation when the material is attached or in close proximity to the RFID tag.

In other applications, the material can be a dielectric that insulates the RFID tag from excitation energy or prevents the RFID antenna from radiating energy. Alternatively, materials having a high magnetic permeability, such as ferrites and certain metals, may be used to enable the printer to control the amount of RFID power coupled into the RFID antenna. This is facilitated by changing the permeability of the material in the presence of the magnetic field produced by the RFID circuit. Additional details of changing operating parameters in an RFID tag by removing materials attached or in close proximity to the RFID tag can be found in commonly-owned U.S. patent application Ser. No. 11/001,808, entitled "RFID Tags with Modifiable Operating Parameters", filed Dec. 1, 2004 now U.S. Pat.No. 7,170,415, which is incorporated by reference in its entirety.

Operational parameters that can be changed by detaching the printable portion containing these above materials include the operating frequency and interrogation range of the label. For example, the separation can affect the operating frequency of the RFID inlay. In this application, the tag can be programmed and used in regions with different operating frequencies. Currently, the United States and Europe have different operating frequencies of RFID tags. Consequently, in conventional RFID printer systems, RFID labels are encoded with a certain operating frequency and the resulting tag is only usable in countries using that operating frequency. However, with the present invention, an RFID tag or label can be made to operate at two distinct frequencies, one in an unseparated state and one in a separated or detached state. For example, the first state can be at an operating frequency for the country of manufacture, and the second state can be at an operating frequency for the country of label use.

In another example, the separation can affect the sensitivity of the RFID inlay. Here, in the unseparated state, the material in the printable portion would cause the tag sensitivity to decrease. This enables the RFID tag to be read and programmed in a printer, but without encountering cross coupling problems, in which other labels loaded into the printer are read as well. Then, in a separated state, the material in the printable portion is detached, thereby enabling the RFID portion to operate normally and giving the label a long range readability, which is advantageous for inventory tracking purposes.

Having thus described embodiments of the present invention, persons skilled in the art will recognize that changes may be made in form and detail without departing from the scope of the invention. For example, the above description detailed the use of a releasable adhesive liner for adhering the RFID tag portion and printable portion onto an object. However, a linerless adhesive can also be used, such as one in which the surface is coated with a glue. The surface is then wetted to enable the RFID tag and optically readable label to be applied to an object. Thus, the invention is limited only by the following claims.

What is claimed is:

1. A label, comprising:
   a first portion having an RFID tag and an adhesive layer disposed along a bottom surface thereof;
   a second portion having a top surface imprintable with optically readable information and the adhesive layer disposed along a bottom surface thereof, wherein the second portion is separable from the first portion; and
   a third portion adjacent to and separable from the first portion, wherein the adhesive layer is bonded to an edge of the third portion.

2. The label of claim 1, wherein the first and second portions are separable along the width of the label.

3. The label of claim 1, wherein the first and second portions are separable along the length of the label.

4. The label of claim 1, further comprising separation means disposed between the first and second portions.

5. The label of claim 4, wherein the separation means comprises a perforation.

6. The label of claim 4, wherein the separation means are directly adjacent the first and second portions.

7. The label of claim 1, wherein the first portion is disposed between the second and third portions.

8. The label of claim 1, wherein:
   the second portion includes a material; and
   the material is selected from a group consisting of a conductor, a dielectric, and a magnetically permeable material.

9. The label of claim 1, wherein:
   the second portion includes a material; and
   the material extends into the first portion.

10. The label of claim 1, wherein:
    the second portion includes a material; and
    the material is in electrical contact with the RFID tag.

11. A method of using a label having an RFID tag portion, a printable portion for optically readable information, and an adhesive layer underlying the RFID tag and printable portions, the method comprising:
    interrogating the RFID tag portion;
    printing optically readable information on the printable portion;
    separating the RFID tag portion from the printable portion;
    adhering the RFID tag portion and the printable portion to an object; and
    separating the RFID tag portion from an extension portion prior to the adhering, wherein the adhesive layer below the RFID tag portion is bonded to the extension portion.

12. The method of claim 11, wherein the interrogating comprises encoding the RFID tag portion.

13. The method of claim 11, wherein information in the RFID tag portion corresponds to the optically readable information on the printable portion.

14. The method of claim 11, wherein the printing is effected after the interrogating.

15. The method of claim 11, wherein the interrogating is effected at approximately the same time as the printing.

16. The method of claim 15, wherein the interrogating and the printing are effected side by side.

17. The method of claim 11, wherein the interrogating and printing are performed at a first location and the separating and adhering are performed at a second location.

18. A method of using a label having an RFID tag portion and printable portion, the method comprising:
    printing optically readable information on the printable portion and interrogating the RFID tag portion at a place where the label is manufactured;
    separating the RFID tag portion from the printable portion and attaching the RFID tag portion and the printable portion to a corresponding object at a place where the label is applied; and
    changing an operational parameter of the RFID tag portion by separating the RFID tag portion from the printable portion.

19. The method of claim 18, wherein the attaching comprises adhering both the RFID tag portion and the printable portion to the object.

20. The method of claim 18, wherein the attaching comprises adhering the printable portion to the object and loosely securing the RFID tag portion on the object.

21. The method of claim 20, wherein the loosely securing comprises hanging the tag on the object.

22. The method of claim 18, further comprising changing an operational parameter of the RFID tag by separating the RFID tag portion from the printable portion.

23. A label, comprising:
    a first portion having an RFID tag and an adhesive layer disposed along a bottom surface thereof;
    a second portion having a top surface imprintable with optically readable information and the adhesive layer disposed along a bottom surface thereof, wherein the second portion is separable from the first portion; and
    a material disposed in the second portion, wherein the material changes at least one operational parameter of the RFID tag when the first portion is separated from the second portion.

24. A method for using a label having an RFID tag portion, a printable portion for optically readable information, and an adhesive layer underlying the RFID tag and printable portions, the method comprising:
    interrogating the RFID tag portion;
    printing optically readable information on the printable portion;
    separating the RFID tag portion from the printable portion; and
    adhering the RFID tag portion and the printable portion to an object, wherein the separating changes an operational parameter of the RFID tag portion, wherein the operational parameter is selected from a group consisting of an operating frequency and a read range of the RFID tag portion.

25. A label comprising:
    a first portion having an RFID tag and an adhesive layer disposed along a bottom surface thereof; and
    a second portion having a printable surface and the adhesive layer disposed along a bottom surface thereof, wherein the second portion is separable from the first portion along a perforation line, the second portion having an antenna coupled to the RFID tag;
    wherein the RFID tag has a first operational state when the first and second portions are connected and a second operational state when the first and second portions are separated.

* * * * *